United States Patent [19]

Pietzsch

[11] Patent Number: 4,861,495
[45] Date of Patent: Aug. 29, 1989

[54] PRESS BELT DEVICE FOR HORIZONTAL FILTERS

[75] Inventor: Kurt E. Pietzsch, Wiesbaden-Sonnenberg, Fed. Rep. of Germany

[73] Assignee: Dorr-Oliver Incorporated, Stamford, Conn.

[21] Appl. No.: 168,729

[22] Filed: Mar. 16, 1988

[30] Foreign Application Priority Data

Mar. 21, 1987 [DE] Fed. Rep. of Germany ....... 3709329

[51] Int. Cl.$^4$ ............................................. B01D 33/04
[52] U.S. Cl. .................................... 210/739; 210/783; 210/770; 210/401; 210/386; 100/47; 100/118; 100/153
[58] Field of Search ............... 210/739, 770, 783, 143, 210/386, 400, 401; 100/37, 47, 118, 153; 162/205, 360.1

[56] References Cited

U.S. PATENT DOCUMENTS

| 4,142,971 | 3/1979 | Le Fur et al. | 210/770 |
| 4,348,290 | 9/1982 | Schipper | 210/783 |
| 4,622,894 | 11/1986 | Crandall et al. | 100/118 |

FOREIGN PATENT DOCUMENTS

| 58-41699 | 3/1983 | Japan | 100/118 |
| 112699 | 7/1983 | Japan | 100/118 |

Primary Examiner—Richard V. Fisher
Assistant Examiner—Coreen Y. Lee
Attorney, Agent, or Firm—Harold M. Snyder

[57] ABSTRACT

A method of dewatering filter cake in which the cake is supported on a positively driven pervious conveyor belt or filter cloth. The cake is guided about the circumference of a drum, with the drum positively driven at a variable speed of rotation. In the region of the drum, the pervious conveyor belt or filter cloth holds the cake against the periphery of the drum and additional pressing rollers press the filter cloth and cake against the drum. The drum drives the filter cloth in this region through the medium of the filter cake and induces shear effects in the cake. The speed of rotation of the drum is regulated in dependence on the tension existing in the filter cloth.

14 Claims, 2 Drawing Sheets

PRESS BELT DEVICE FOR HORIZONTAL FILTERS

BACKGROUND OF THE INVENTION

1. Field of the Invention:

The invention is directed to an improved horizontal vacuum belt filter.

2. Description of Related Art:

In the known horizontal belt filters, the filter cloth is generally endless and is first passed over a vacuum belt filter in which a reduced pressure or vacuum, applied through the filter cloth, causes liquid to be sucked out of the filter cake which lies on the filter cloth. The filter cake is thrown off at the end of such a belt filter and the filter cloth is returned to the front end of the belt filter where it receives fresh suspension which is to be dewatered. Often, however, the dewatering action is not adequate so that additional measures must be taken. Thus, there has been utilized a filter system in which a belt filter is followed by a belt press wherein the filter cloth with the filter cake is passed around a drum in a U-shaped loop with pressing rollers pressing the filter cloth and the filter cake against the periphery of the drum and in so doing compacting the filter cake and further dewatering it. In the arrangement just described, the belt filter and the belt press generally have their own separate drives for the circulating filter cloth. Insofar as belt presses of that kind are previously known, the filter cloth is driven in the belt press by a drive roller which lies outside the drum. In that arrangement the drive roller firstly drives an endless pressing belt which by means of direction-changing rollers passes in a U-shaped loop around the drum, wherein the filter cloth with the filter cake is arranged between the pressing belt and the drum. The pressing belt which is driven in that way now entrains the filter cloth lying thereon, by direct frictional engagement. As the pressing belt and the filter cloth are laid around the drum in a U-shaped loop, they already apply a considerable force to the bearings of the drum, which is compensated by a corresponding counteracting force in the bearings of the direction-changing rollers of the pressing belt. The corresponding frictional forces in the bearings of the drum are additionally further increased by pressing rollers which press from the outside against the pressing belt and the filter cloth. When the filter cloth is driven, it transports the filter cake and drives the drum at the periphery of the latter, with the drum in practice rolling against the filter cake. The frictional forces which are to be overcome in the bearings of the drum in that arrangement can produce a considerable tension in the filter cloth. That is especially the case if a shearing action on the filter cake is to be produced by additionally braking the drum, in order in that way to improve the dewatering effect. The filter cloth which ultimately is driven by the friction of the pressing belt is subjected to a relatively high rate of water in that arrangement, it is subjected to stretching and finally it may even tear.

SUMMARY OF THE INVENTION

The present invention is directed to a horizontal belt filter in which the drum is driven at a variable speed of rotation and the drive for the filter cloth is effected by way of the filter cake which is subjected to a shear effect, and in which the speed of rotation of the drum is regulated in dependence on the tension of the filter cloth.

Because the filter cloth is also driven indirectly by way of the filter cake, instead of being driven by way of the frictional effect of a tensioning belt or a drive roller which engages the filter cloth on the outside thereof, the filter cloth is subjected to a lower level of loading and so does not wear quickly. The drive for the drum is deliberately effected independently of the drive of a belt filter disposed upstream thereof and it is also driven at a variable speed of rotation as, depending on the nature of the filter cake and the surface finish of the drum, a certain slippage must be calculated into the arrangement so that the tension in the filter cloth decreases. In accordance with the invention however the speed of rotation of the drum is regulated in dependence on the tension in the filter cloth, thereby guaranteeing a constant and a uniform filter cloth tension, whereby the degree of water and stretch of the filter cloth are reduced to a minimum. As the filter cake transmits the drive force from the drum to the filter cloth, shearing forces act over the thickness of the filter cake and cause plastic deformation of the filter cake and produce a corresponding shearing area. In that situation, liquid ducts tear open in the interior of the filter cake and promote and accelerate dewatering of the filter cake.

Preferably, the method according to the invention provides that measurement of the tension in the filter cake is effected by way of an ultra-sound sensor which by distance measurement detects the sag of the filter cloth which hangs free between the belt filter and the belt press.

If the filter cloth is passed in a free condition over a certain distance, it sags due to its own weight but in particular due to the weight of the filter cake, under the effect of the force of gravity, wherein the amount of sag, that is to say the deviation in respect of the surface of the filter cloth from a horizontal plane through the points at which the filter cloth is supported, is a measurement in respect of the tensile stress in the filter cloth. That deviation is at its greatest at the center between the filter cloth support points so that the appropriate measurements are desirably taken at that location. In that connection the spacing of the filter cloth from an outer point which is fixed with respect to the support points of the filter cloth can be measured very rapidly and in a contactless manner by means of an ultra-sound sensor so that the drive for the drum can be regulated in fractions of a second. That makes it possible to achieve very low levels of fluctuation in the tensile loading in the filter cloth.

The measuring means continuously detects the tension in the filter cloth and the measurement values are used by way of a control means directly for regulating the speed of rotation of the drive drum. When the regulating parameters of the control means are correctly set, the tension in the filter cloth then remains substantially constant during operation of the belt press and is therefore subjected to only very slight fluctuations. Serious wear and excessive stretching of the filter cloth is thereby prevented.

In accordance with the invention, at least one and preferably two or three pressing rollers are arranged at the drum and preferably at the rising side thereof.

The pressing rollers are oriented with their axes parallel to the axis of the drum and the filter cloth with the filter cake passes between the drum and the pressing rollers so that the pressing rollers press from the underside against the filter cloth and press it with the filter cake against the drum. In that arrangement, liquid contained in the filter cake is pressed out of the filter cake to an increased degree and can drain away through the filter cloth. Generally the drum is also enclosed by a cover belt which then lies between the drum surface and filter cake.

It has also been found to be advantageous if in accordance with the invention each pressing roller has pneumatic piston units by means of which it can be pressed resiliently against the underside of a pressing belt, wherein the filter cloth lies against the pressing belt and can be pressed thereby, with the filter cake, against the periphery of the drum. The pneumatic piston units exert a uniform force and may possibly also yield if the filter cake does not lie in a homogenous or uniformly thick condition on the filter cloth.

In that arrangement the first pressing roller preferably lies against the filter with a contact pressure measured in 10 kp/cm (kiloponds per centimeter) which is between 5 and 10 kp/cm (linear). That is to say, a pressing roller which is 1 meter in length would have to be pressed against the filter cloth or against the drum with a force of 500 to 1000 kp. The maximum contact pressure of the second pressing roller corresponds at a maximum to a force of 15 to 25 kp/cm (linear).

Further advantages, features and possible uses of the present invention will be apparent from the following description and the accompanying drawings in which.

DESCRIPTION OF THE PREFERRED EMBODIMENT

Figure 1:
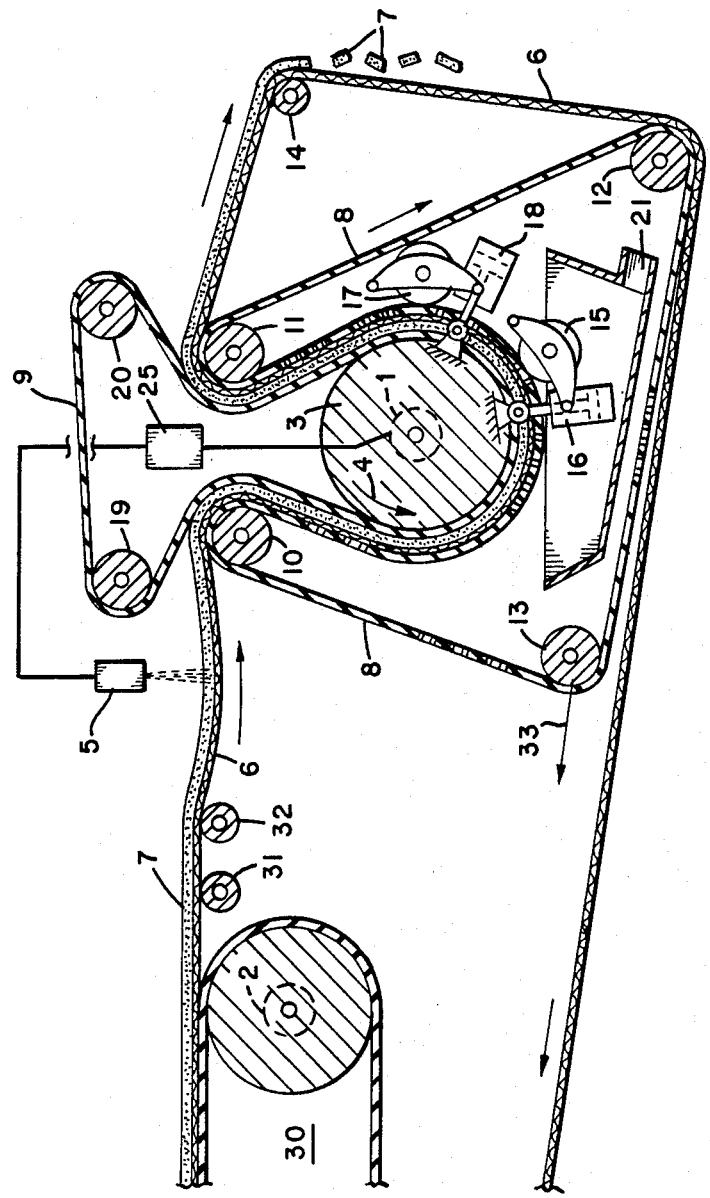
FIG. 1 is a view in longitudinal section through a belt press according to the invention.
Figure 2:
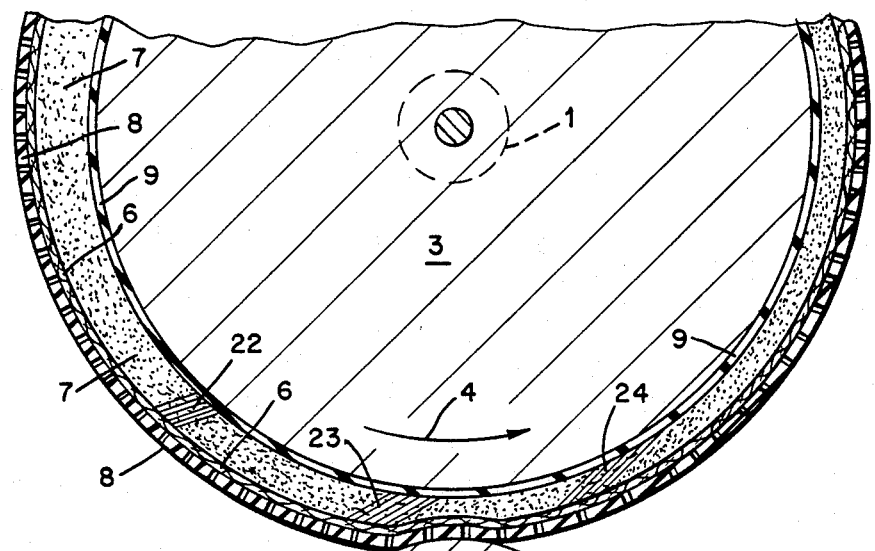
FIG. 2 shows a part of the driven drum with filter cake, filter cloth, pressing belt and pressing roller, and FIG. 3 diagrammatically shows the shearing action on the filter cake along the periphery of the drum and in particular in the region of a pressing roller.
Figure 3:
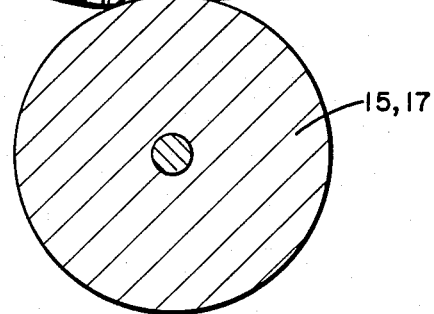
Figure 3:
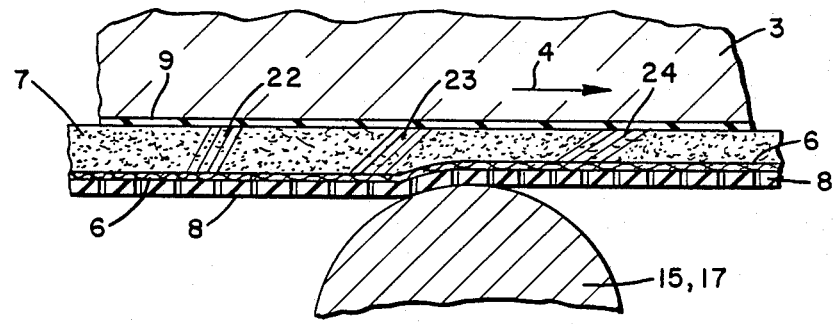

Referring to FIG. 1, shown therein in the lengthwise direction is the end of a horizontal vacuum belt filter with a separate drive 2 for the filter cloth 6. The filter cloth 6 passes over support rollers 31 and 32, sags in a free condition in the region between the support roller 32 and the direction-changing roller 10 and is picked up at the direction-changing roller 10 between a pressing belt 8 and a cover belt 9 and passed in a U-shaped loop around the drum 3. The filter cloth 6 passes through both the vacuum filter 30 and also the belt press, in the manner of an endless belt. While the filter cloth is transported in the vacuum filter 30 by a drive 2 thereof, in the belt press it is driven by the drum 3 which rotates in the direction indicated by the arrow 4. The pressing belt which is guided by the directionchanging rollers 10, 11, 12 and 13 causes the filter cloth 6 with the filter cake 7 to be laid around the drum 3 in a U-shaped loop, with the filter cake

I claim:

1. In a method of further dewatering filter cakes (7) with a belt press in which the filter cake (7) which lies on a filter cloth (6) is guided over a belt filter (30), and then through a belt press which comprises a drum (3) around which the filter cloth (6) is partially laid in such a way that the filter cake (7) lies against the drum (3), wherein additional pressing rollers (15, 17) press the filter cloth (6) and the filter cake (7) against the drum (3) and thereby dewater same and wherein the filter cloth (6) is driven so that the drum (3) rolls against the filter cake (7); the improvement comprising driving the drum (3) at a variable speed of rotation to thereby drive the filter cloth (6) through contact with the intermediate filter cake (7) which is subjected to a shear effect, measuring the tension of the filter cloth (6) and regulating the speed of rotation of the drum (3) in dependence on the tension of the filter cloth (6).

2. A method according to claim 1 wherein the tension in the filter cloth is determined by a distance measurement of the sag of the filter cloth using an ultra-sound sensor and the measurement is communicated to a control means for regulating the speed rotation of the drum.

3. In a belt press which is disposed downstream of a belt filter (30), which is a horizontal vacuum belt filter, at the cake discharge side, comprising rotatable drum (3) against the periphery of which a generally endless filter cloth (6) at least partly lies with a filter cake, said filter cloth also passing over the belt filter, and comprising a drive for the filter cloth (6), the improvement comprising a separate drive for the belt press in which the drum (3) is in the form of a drive drum, a measuring means (5) is provided which measures the tension in the filter cloth (6) between the belt filter (30) and the belt press, and wherein the measuring means (5) is connected to the drum drive (1) by way of a control means for regulating the speed of rotation of the drive drum (3).

4. A belt press according to claim 3 wherein one or more, pressing rollers (15, 17) are arranged at the drum (3) and located at the rising side thereof.

5. A belt press according to claim 4 wherein each pressing roller (15, 17) has a pneumatic piston unit (16, 18) by means of which the pressing rollers (15, 17) can be resiliently pressed against the underside of a pressing belt (8), and wherein the filter cloth (6) lies on the pressing belt (8) and can be pressed thereby, with the filter cake (7), against the periphery of the drum (3).

6. A belt press according to claim 5 wherein the pressing belt (8), in the form of an endless belt, can be variable tensioned by means of at least one radially displaceable direction-changing roller (10, 11, 12, 13).

7. A belt press according to claim 5 wherein the pressing belt (8) is perforated.

8. A belt press according to claim 6 wherein the pressing belt (8) is perforated.

9. A belt press according to claim 3 wherein the filter cloth (6) is freely tensioned between the belt filter (30) and the belt press and that the measuring means (5) includes an ultra-sound sensor for detecting substantially the vertical distance between said sensor and the filter cloth (6) in the region between the belt filter (30) and the belt press.

10. A belt press according to claim 4 wherein the filter cloth (6) is freely tensioned between the belt filter (30) and the belt press and that the measuring means (5) includes an ultra-sound sensor for detecting substantially the vertical distance between said sensor and the filter cloth (6) in the region between the belt filter (30) and the belt press.

11. A belt press according to claim 5 wherein the filter cloth (6) is freely tensioned between the belt filter (30) and the belt press and that the measuring means (5) includes an ultra-sound sensor for detecting substantially the vertical distance between said sensor and the filter cloth (6) in the region between the belt filter (30) and the belt press.

12. A belt press according to claim 6 wherein the filter cloth (6) is freely tensioned between the belt filter (30) and the belt press and that the measuring means (5) includes an ultra-sound sensor for detecting substantially the vertical distance between said sensor and the filter cloth (6) in the region between the belt filter (30) and the belt press.

13. A belt press according to claim 7 wherein the filter cloth (6) is freely tensioned between the belt filter (30) and the belt press and that the measuring means (5) includes an ultra-sound sensor for detecting substantially the vertical distance between said sensor and the filter cloth (6) in the region between the belt filter (30) and the belt press.

14. A belt press according to claim 8 wherein the filter cloth (6) is freely tensioned between the belt filter (30) and the belt press and that the measuring means (5) includes an ultra-sound sensor for detecting substantially the vertical distance between said sensor and the filter cloth (6) in the region between the belt filter (30) and the belt press.

* * * * *